R. A. WAKEFIELD.
SELF PROPELLED VEHICLE.
APPLICATION FILED SEPT. 24, 1918.

1,336,935. Patented Apr. 13, 1920.

Inventor
Ralph A. Wakefield
By Strong & Townsend
Attorneys.

UNITED STATES PATENT OFFICE.

RALPH A. WAKEFIELD, OF SACRAMENTO, CALIFORNIA.

SELF-PROPELLED VEHICLE.

1,336,935.  Specification of Letters Patent.  Patented Apr. 13, 1920.

Application filed September 24, 1918. Serial No. 255,429.

*To all whom it may concern:*

Be it known that I, RALPH A. WAKEFIELD, a citizen of the United States, residing at Sacramento, in the county of Sacramento and State of California, have invented new and useful Improvements in Self-Propelled Vehicles, of which the following is a specification.

This invention relates to a toy, and particularly pertains to a self-propelled vehicle.

It is the principal object of this invention to provide a small vehicle especially adapted for use by children, and which may be readily operated by an arm movement of the occupant, at the same time being easily guided by manipulation of a steering mechanism upon which the feet rest.

An incidental object of the invention is to provide a propelling mechanism which will give exercise to the arms and body of the occupant, and thus affords a simple means of locomotion and physical exercise for invalids, as well as children.

The invention contemplates the use of a main frame upon which is mounted an adjustable seat, and beneath which is disposed a four wheel running gear, the wheels of which are connected in pairs by operating rods extending along each side of the vehicle, the frame being further provided with a combined foot rest and steering mechanism by which the vehicle may be guided along its course of travel.

The invention is illustrated by way of example in the accompanying drawings in which—

Figure 1:
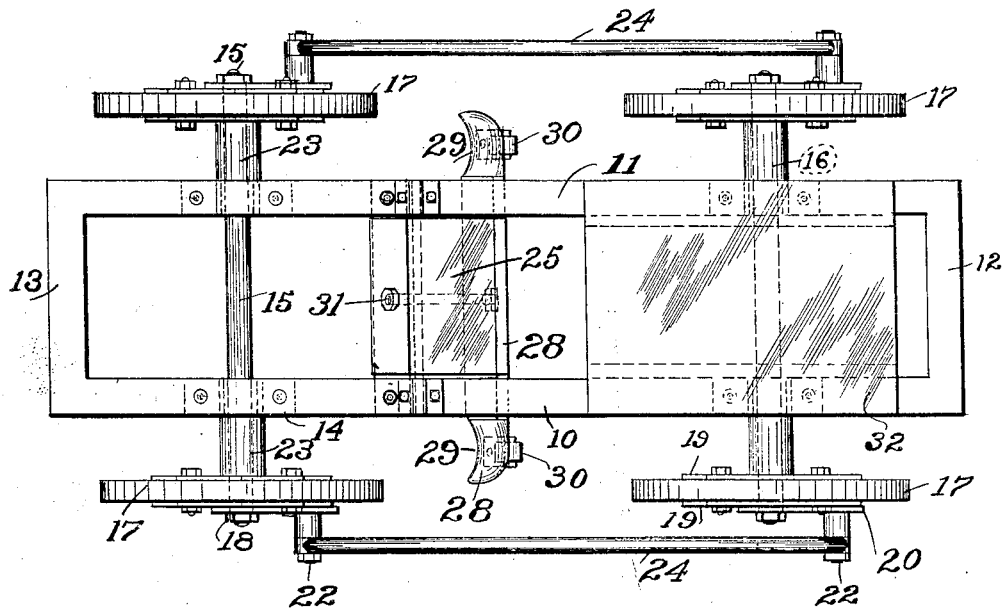
Figure 1 is a view in plan illustrating the completely assembled vehicle clearly showing the position of the steering mechanism and the operating members.

Referring to the drawings the vehicle is shown as having a rectangular frame formed by parallel side rails 10 and 11 and connecting end rails 12 and 13. Secured to the under side of the side rails are bearing brackets 14, which are arranged in pairs at the front and rear of the vehicle frames and are adapted to receive front and rear axles 15 and 16. These axles extend outwardly from the opposite sides of the frame and there receive wheels 17. The wheels are firmly bolted in place upon the ends of the axles by nuts 18 which engage threads upon the axle ends. In order to reinforce the wheels side plates 19 are fixed to them as shown in the drawings. The side plates also carry crank plates 20, which extend radially from the axles, and are formed with a series of holes 21 into which stud shafts 22 may be positioned. The wheels are held in spaced relation to the frame of the vehicle by means of tubular sleeves 23.

Figure 2:
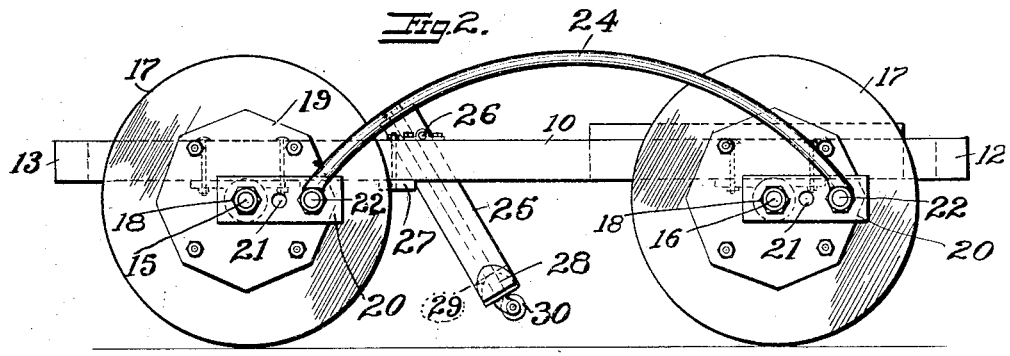
Fig. 2 is a view in side elevation illustrating the assembled vehicle, and particularly disclosing the manner in which the operating rods connect with the front and rear wheels of the running gear.
Figure 3:
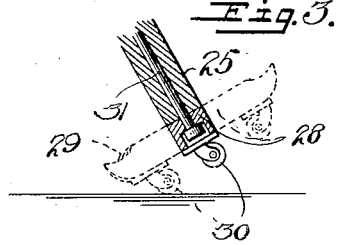
Fig. 3 is a fragmentary cross section through the foot steering bar.

The stud shafts of the wheels extend outwardly from the faces thereof and parallel to the axles. These shafts are adapted to be engaged by the opposite ends of propeller bars 24. As particularly shown in Fig. 2 these bars are pivotally secured upon the stud shafts 22 of the wheels at each side of the vehicle frame, and are there held by suitable nuts. The bars preferably assume an arch between their two connections, and thus provide a connecting rod for a convenient gripping portion by which the wheels of the vehicle may be caused to rotate.

Disposed between the side rails 10 and 11 of the frame and dependent therefrom is a downwardly and rearwardly extending block 25. This block is suitably held upon a shaft 26 and is adapted to rest upon a transverse bar 27 fixed to the under side of the rails and in front of the member 25. The lower end of the block 25 terminates a short distance above the ground and is there provided with a cross bar 28 pivoted thereto for substantially horizontal movement. This bar may be termed a foot rest and steering bar, and is formed with recessed portions 29 at its opposite ends within which the feet of the driver may rest, and by which they will be held against slipping. Disposed beneath the ends of the bar 28 are small roller casters 30. These casters may be alternately brought to bear against the ground as the bar is swung upon its central pivot bolt 31, this bolt extending through the block 25 and terminating therein, the bar turning on the bolt.

A seat 32 is mounted upon the frame and provided with guide members which will hold it against lateral movement, and, at the same time, will allow it to slide longitudinally, and thus be readily adjusted to accommodate persons of different size.

In operation the operator occupies a seat and places his feet in the arcuate rest portions of the bar 28. The vehicle may then be set in motion by grasping the propeller bars 24 and imparting a forward gyratory motion to them. This motion will cause all of the wheels to rotate simultaneously and propel the vehicle in a forwardly direction. When it is desired to turn the vehicle to one side the foot of the driver is caused to bear down upon that end of the bar 28, which will bring that end of the bar both forward and down, on account of the angular positioning of the block 25 and the bar. The caster 30 at that end of the bar then engages with the ground, and if the pressure on the bar is then increased, the wheels 17 on that side will be raised from the ground, and the driving force on the opposite wheels will cause the vehicle to swing about the caster as a pivot. This action may also be used when it is desired to retard the vehicle speed.

It will thus be seen that the structure here disclosed, while simple in its operation and construction, provides desirable means for propelling a small vehicle, and is especially adapted for use as a toy.

While I have shown the preferred form of my invention as now known to me, it will be understood that various changes in the construction, combination and arrangement of parts may be made by those skilled in the art without departing from the spirit of the invention as claimed.

Having thus described my invention, what I claim and desire to secure by Letters Patent is:

1. A vehicle comprising a frame, a low seat thereon, axles mounted to the frame, wheels secured to the axles, and opposite side bars connecting the wheels on each side in a manner to cause them to be rotated by a gyratory movement of the bars, the bars being arched upwardly above the plane of the frame and seat and adapted as hand-holds whereby they may be easily grasped and operated by a person occupying the seat.

2. A vehicle comprising a frame, a seat thereon, wheels mounted to the frame in transverse pairs, the wheels being adapted to be rotated by the occupant of the seat, and a common means operable by the feet of said occupant whereby the wheels on either side may be withheld from contact with the ground.

3. A vehicle comprising a frame, a seat thereon, wheels mounted to the frame in transverse pairs, the wheels being adapted to be rotated by the occupant of the seat, a foot rest pivotally mounted to the frame transversely thereof and at an angle to a vertical plane, and casters on the outer ends of the foot rest adapted to bear against the ground when that side of the foot rest is moved forward.

4. A vehicle comprising a main frame, an adjustable seat thereupon, a pair of permanently alined axles carried beneath the opposite ends of the main frame, wheels fixed upon the ends of the axles, propelling means connected to the complementary wheels along the opposite sides of the frame whereby gyratory motion of said means will effect simultaneous rotation of said wheels, means for adjusting the propelling means in relation to the wheels whereby variation in the relative operating movements of the mechanism will be effected, a foot rest carried by the vehicle and adapted to bear upon the ground, and means whereby manipulation of the foot rest will act to guide the vehicle.

In testimony whereof I have hereunto set my hand in the presence of two subscribing witnesses.

RALPH A. WAKEFIELD.

Witnesses:
 SILVEY PEARLE TINSLER,
 R. P. TALBOT.